United States Patent [19]

Baker

[11] 4,331,391
[45] May 25, 1982

[54] LENS SYSTEM HAVING WIDE ANGLE OBJECTIVES

[75] Inventor: James G. Baker, Bedford, N.H.

[73] Assignee: The United States of America as represented by the Secretary of the Air Force, Washington, D.C.

[21] Appl. No.: 150,522

[22] Filed: May 16, 1980

[51] Int. Cl.³ .......................... G02B 9/64; G02B 13/18
[52] U.S. Cl. ..................................... 350/463; 350/432; 350/450
[58] Field of Search ........................ 350/463, 450, 432

[56] References Cited

U.S. PATENT DOCUMENTS 2,821,113  1/1958  Baker .................................. 350/463
3,039,361  6/1962  Baker .................................. 350/463

OTHER PUBLICATIONS

Levine et al.; "The Geocon IV Lens;" *Photogrammetric Engineering;* vol. 36, No. 4, Apr. 1970, pp. 335-342.

Primary Examiner—John K. Corbin
Assistant Examiner—Scott J. Sugarman
Attorney, Agent, or Firm—Donald J. Singer; Arsen Tashjian

[57] ABSTRACT

Wide angle optical objectives for use in aerial mapping cameras to provide improved resolving power and improved contrast rendition derived from the pattern of glass types and lens data employed. The outermost elements are weakly positive menisci to produce an initial convergence of rays before the mating negative elements are introduced thereby keeping the physical length of the system within modest proportions. Strong negative elements lying outside of centrally located strong positive elements provide favorable illumination over a wide angle field. Wafer elements near the center of the system serve to minimize chromatic astigmatism and to reduce the actual sagittal depth of the aspherics. Wafers of high index flint glass are located next to the central stop in order to obtain good chromatic spherical correction in the tangential rays over the field.

2 Claims, 2 Drawing Figures

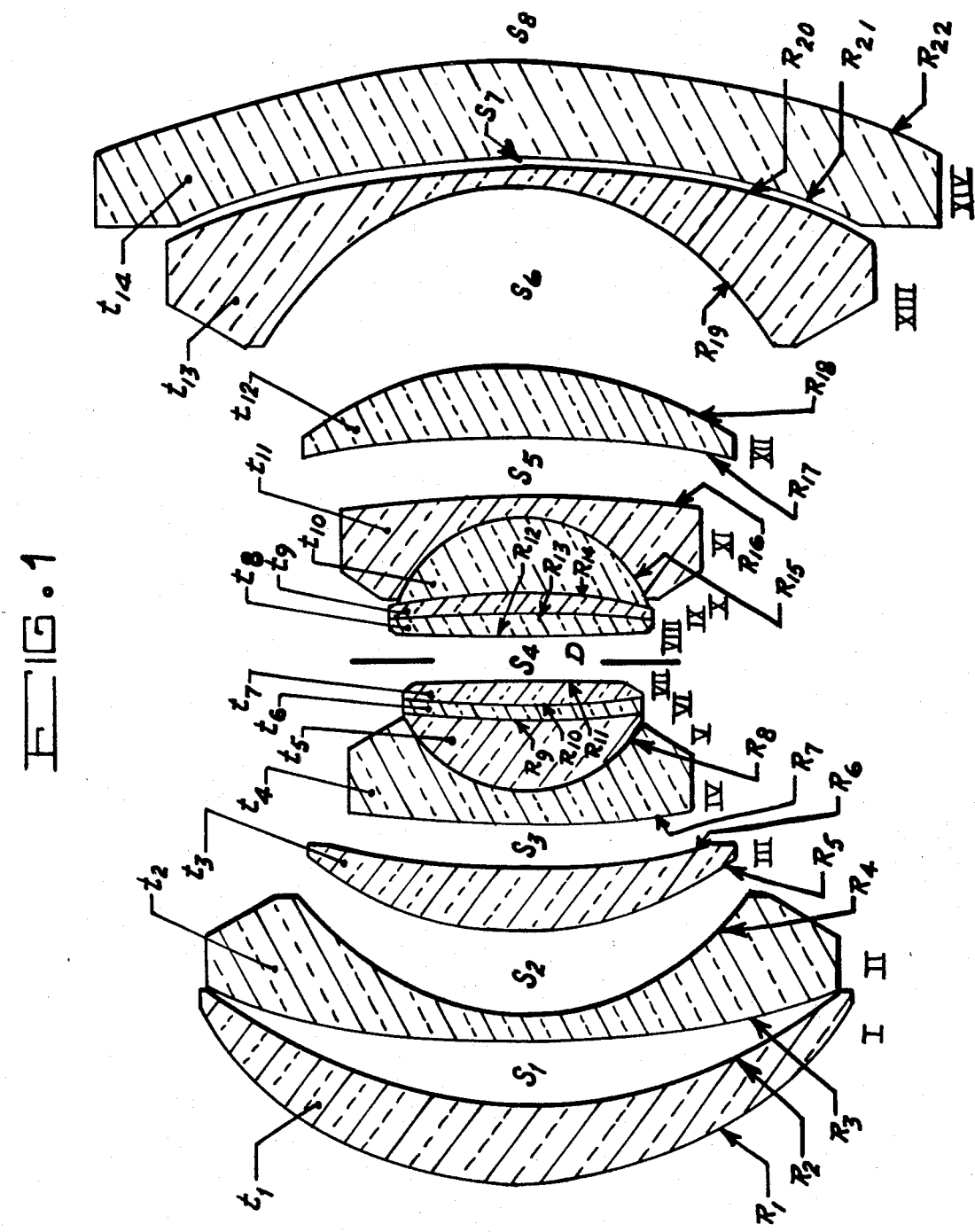

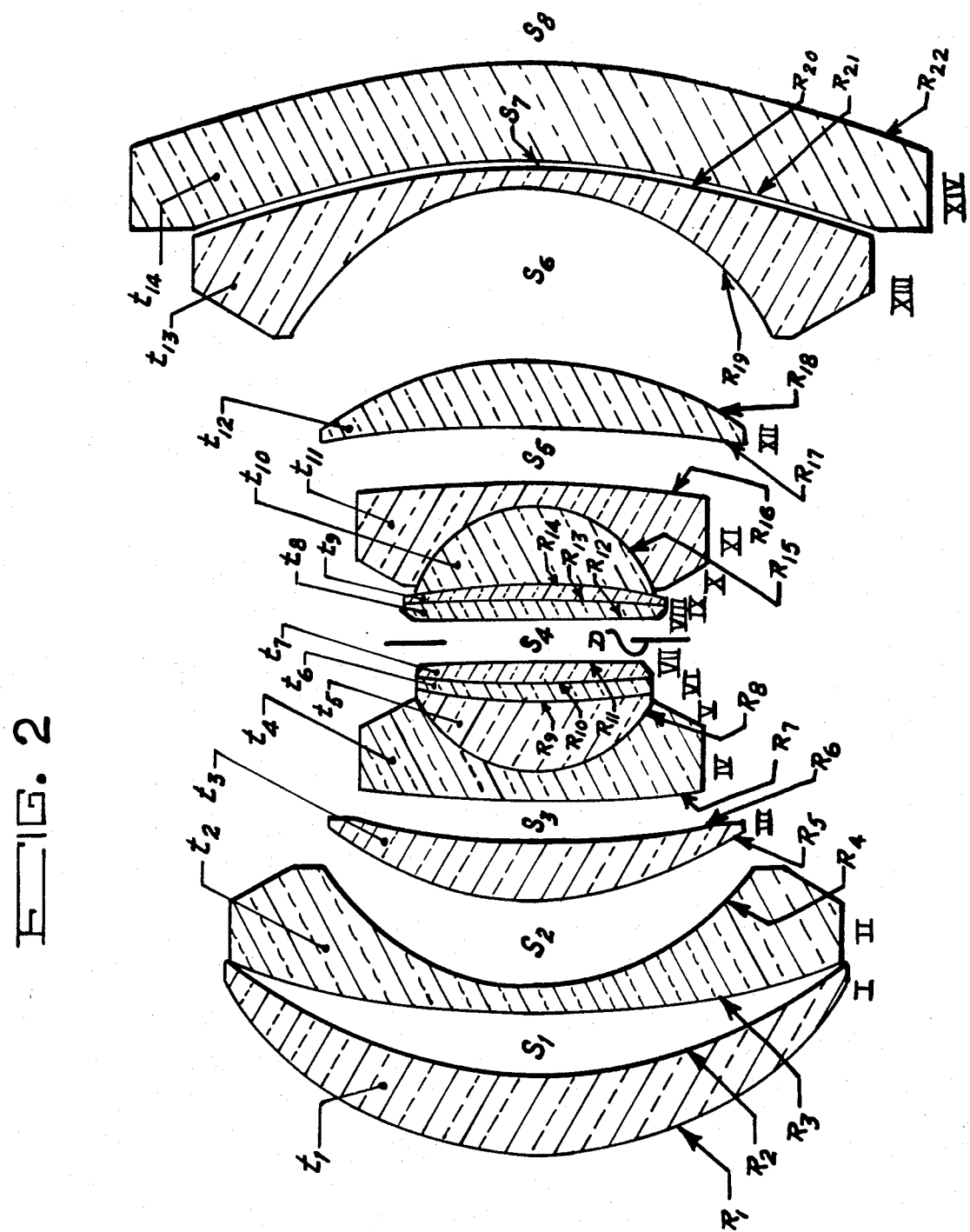

LENS SYSTEM HAVING WIDE ANGLE OBJECTIVES

STATEMENT OF GOVERNMENT INTEREST

The invention described herein may be manufactured and used by or for the Government for governmental purposes without the payment of any royalty thereon.

BACKGROUND OF THE INVENTION

This invention relates to wide angle photographic objectives and, more particularly, the invention is concerned with providing improved lens systems suitable for aerial mapping wherein wafer elements of high index flint glass are used next to a central stop and additional wafer elements are introduced for reducing chromatic astigmatism.

The basic form of the wide angle optical objective is described in my U.S. Pat. No. 2,821,113 and improved forms of the lens system are described in my U.S. Pat. No. 3,039,361. The hereinafter presented disclosure presents an improved lens system wherein the chromatic astigmatism and the oblique spherical aberration in the skew direction in the previously patented lens systems are reduced by adopting the more complex structure including the aspherics described below.

In the lens system described in U.S. Pat. No. 2,821,113, the outermost elements are weakly positive menisic, or at least, the first element must be weakly positive. There is thus an initial convergence of the rays before the negative element is introduced, a factor that keeps the physical length of the system within modest proportions. The general concept of strong negative elements lying outside of centrally located strong positive elements is used for the purpose of obtaining favorable illumination over the wide angle field. Ten elements were employed, five on either side of the central stop. Inasmuch as the relative heights through the system on either side are not very different between negative and positive refractions, a circumstance favorable to good oblique performance over a wide field, it proved necessary to introduce one high index type glass on either side to preserve the desired lens power. Also, it should be noted that the negative concentric refraction on either side obtained at a cemented surface, though essential for eliminating a good part of spherical aberration of the system without imparting oblique spherical aberration, does weaken the system. The positive element is necessarily of lower index than the adjacent negative element, so that the dioptric power at the interface is strongly negative. This same circumstance is unfavorable to the Petzval sum, or conversely, for a given low Petzval sum of such a wide angle system, is unfavorable for the net lens power and causes a general run of steep curvatures. The introduction of the high index elements offsets such an adverse effect.

In the lens systems descirbed in U.S. Pat. No. 3,039,361, greater lens speeds are achieved without sacrifice of resolving power, contrast or correction for distortion. In one of these systems a glass pressure plate was introduced at the image plane for the purpose of keeping the emulsion as flat as possible. Introduction of the glass plate greatly upset the symmetry of the design at high angles and to a corresponding sensitivity in the compensating refractions, leading to exaggerated astigmatism at high angles. In another of these systems, an attempt was made to obtain wide angle performance at f/2.5 for a 3-inch focal length on a 4.5 by 4.5-inch format. The goal was reached but at a cost of very enchanced sensitivity to centration errors and to radii. From the foregoing remarks, it can be seen that an improvement of the color correction both longitudinally and with respect to chromatic astigmatism would be desirable in order to provide a mapping lens system more commercially usable by aerial survey companies.

SUMMARY OF THE INVENTION

The present invention is concerned with providing a lens system having wide angle objectives. A high index lanthanum crown glass is used for the second and next to last negative elements to obtain a favorable illumination of the pupil over the field. Wafer elements are introduced near the center of the system and to reduce the actual sagittal depth of the aspherics which were optimized to eliminate oblique spherical aberration and comatic tendencies over the field.

For most applications in the aerial mapping application it is vital to have an objective capable of forming a sharp image at maximum contrast on a flat image plane with distortion held to almost negligible residuals over the full field. For example, an objective of 6 inches focal length covering a 94-degree diagonal full field might be expected to have distortion residuals not exceeding 10 microns anywhere in the field, where the distortion is measured in terms of the lateral displacement in the image plane of the actual from the ideal grid points. Similarly, an objective of 3 inches focal length might be expected to have distortion residuals not exceeding 5 microns anywhere in the field. Such stringent requirements for correction of distortion lead in turn to close tolerances in every way in production and require excellent workmanship. In the design phase such correction of distortion has a determining effect on choice of basic lens type.

It is essential to the optimum performance of this class of wide angle objectives that the two surfaces adjacent to the central stop to be figured aspherically to a shape dependent on the aperture-ratio, field angle and color correction. One will find that the larger the field angle to be covered, the more aspheric the figuring to achieve optimum balance of comatic residuals at some chosen node in the field. Without the aspheric figuring one would quickly find that the comatic residuals become unacceptably large. In general, the aspheric shape of the surface on the long conjugate side of the central stop tends toward an "up-edge", which is to say, that the zones increasingly far from the axis become increasingly megative in optical effect. However, it has proved possible to have the 5th order term governing the slope of the aspheric, which is the sixth order term in the depth, of reversed algebraic sign. This feature causes the rate of change of the up-edge to decrease at the periphery, which ultimately would lead to a turned-down edge at zones outside the working aperture. Such a rolled shape favors the polishing action in the process of aspheric figuring and renders fabrication not quite so difficult as it otherwise would be for an aspheric shape having ever-increasing turned-up effect.

Also, in general, the aspheric shape of the surface on the short conjugate side of the central stop tends toward a "down-edge", which is to say, that the zones increasingly far from the axis become increasingly positive in optical effect. Here in addition the 6th order term in the depth becomes even more turned-down in effect. The optician therefore will find that his figuring toward a turned-down shape will proceed in a natural way and that his ring laps will tend to follow a smooth curve.

BRIEF DESCRIPTION OF THE DRAWINGS

FIG. 1 is a graphical portrayal of a system such as that of Example I; and
FIG. 2 is a graphical portrayal of a system such as that of Example II.

DESCRIPTION OF THE PREFERRED EMBODIMENTS

In the Examples I and II the aspheric shapes are described by the following expression:

$$\xi_i = \frac{C_i \eta_i^2}{1 + 1 - C_i \eta_i^2} + \beta_i \eta_i^4 + \gamma_i \eta_i^6 + \delta_i \eta_i^8 + \epsilon_i \eta_i^{10}$$

where $C_i$ is the curvature of the ith surface, $\beta_i$, $\gamma_i$, $\delta_i$, and $\epsilon_i$ (beta$_i$, gamma$_i$, delta$_i$ and epsilon$_i$) are the coefficients of the aspheric polynomial terms, and $\xi_i$(xi$_i$) and $\eta_i$(eta$_i$) are the sagitta and zone height respectively. Thus, for any given $\eta_i$, one can compute $\xi_i$. In general, one tabulates $\xi_i$ as a function of $\eta_i$, from which the properly shaped aspheric lapping tools can be made. In the corresponding data given in the examples below, all dimensional data are given in terms of the calibrated focal length as unit length, where the calibrated focal length is the adjusted equivalent focal length needed to reduce the overall distortion residuals to a minimum (scale adjustment). Hence, to convert to millimeters one must multiply all dimensional quantities by the desired focal length in millimeters, whatever it may be.

Referring now, more particularly, to FIG. 1 and a first example, in which and in the other example the Roman numerals designate the lens elements of the system, R is the radius of curvature, t is the axial thickness, S is the axial separation, $n_D$ is the index of refraction for the D-line of the spectrum (5893 angstroms, being the means of the sodium doublet), $\nu$ (nu) is the Abbe number, and the right-hand column indicates examplary glass types.

EXAMPLE I

| Element | Radii | Thicknesses | $n_d$ | $\gamma_d$ | Type |
|---|---|---|---|---|---|
| | (C.F.I. = 1.0000 E.F.L. = 1.0000 f/4.937) | | | | |
| I | $R_1$ = 0.4832 | | | | |
| | | $t_1$ = 0.1016 | 1.6433 | 47.76 | 643478 |
| | $R_2$ = 0.6274 | | | | |
| | | $S_1$ = 0.0773 | | | |
| | $R_3$ = 1.4230 | | | | |
| II | | $t_2$ = 0.0323 | 1.7550 | 53.28 | 755533 |
| | $R_4$ = 0.3337 | | | | |
| | | $S_2$ = 0.1054 | | | |
| | $R_5$ = 0.4398 | | | | |
| III | | $t_3$ = 0.0836 | 1.8807 | 41.06 | 881411 |
| | $R_6$ = 1.2063 | | | | |
| | | $S_3$ = 0.0523 | | | |
| | $R_7$ = 2.0510 | | | | |
| IV | | $t_4$ = 0.0378 | 1.6129 | 36.95 | 613370 |
| | $R_8$ = 0.1739 | | | | |
| V | | $t_5$ = 0.0884 | 1.5567 | 58.54 | 557585 |
| | $R_9$ = 1.0724 | | | | |
| VI | | $t_6$ = 0.0189 | 1.7755 | 37.90 | 776379 |
| | $R_{10}$ = 3.1058 | | | | |
| VII | | $t_7$ = 0.0243 | 1.7847 | 26.10 | 785261 |
| | $R_{11}$ = Ashp.[2] | | | | |
| | | $S_4$ = 0.0621[1] | | | |
| | $R_{12}$ = Ashp.[2] | | | | |
| VIII | | $t_8$ = 0.0243 | 1.7847 | 26.10 | 785261 |
| | $R_{13}$ = −3.1058 | | | | |

-continued

| Element | Radii | Thicknesses | $n_d$ | $\gamma_d$ | Type |
|---|---|---|---|---|---|
| | (C.F.I. = 1.0000 E.F.L. = 1.0000 f/4.937) | | | | |
| IV | | $t_9$ = 0.0189 | 1.8807 | 41.06 | 881411 |
| | $R_{14}$ = −1.0724 | | | | |
| X | | $t_{10}$ = 0.0938 | 1.5567 | 58.54 | 557585 |
| | $R_{15}$ = −0.1739 | | | | |
| XI | | $t_{11}$ = 0.0323 | 1.6129 | 36.95 | 613370 |
| | $R_{16}$ = −2.0510 | | | | |
| | | $S_5$ = 0.0709 | | | |
| | $R_{17}$ = −1.9043 | | | | |
| XII | | $t_{12}$ = 0.0852 | 1.8807 | 41.06 | 881411 |
| | $R_{18}$ = −0.4931 | | | | |
| | | $S_6$ = 0.2229 | | | |
| | $R_{19}$ = −0.3584 | | | | |
| XIII | | $t_{13}$ = 0.0323 | 1.7885 | 50.45 | 789505 |
| | $R_{20}$ = −1.1833 | | | | |
| | | $S_7$ = 0.0018 | | | |
| | $R_{21}$ = −1.1792 | | | | |
| XIV | | $t_{14}$ = 0.1260 | 1.6433 | 47.76 | 643478 |
| | $R_{22}$ = −1.2623 | | | | |
| | | $S_8$ = 0.3225 | | | |

[1] The stop lies between $R_{11}$ and $R_{12}$ and has a clear aperture of 0.1852 at a distance along the axis of 0.0204 from $R_{11}$.
[2] Surfaces 11 and 12 above are both aspheric, have coefficients taken from the equation just previously herein stated, and have the following shapes for a 94-degree full field:
$C_{11}$ = 0.054683 $\beta_{11}$ = 0.32272 $\gamma_{11}$ = −38.786
$\delta_{11}$ = 638.12 $\epsilon_{11}$ = −10643.
$C_{12}$ = 0.183844 $\beta_{12}$ = 1.39282 $\gamma_{12}$ = 36.356
$\delta_{12}$ = −720.12 $\epsilon_{12}$ = 15382.

Referring now to FIG. 2 and another example:

EXAMPLE II

| Element | Radii | Thicknesses | $n_d$ | $\gamma_d$ | Type |
|---|---|---|---|---|---|
| | (C.F.I. = 1.0000 E.F.L. = 1.0000 f/4.983) | | | | |
| I | $R_1$ = 0.4736 | | | | |
| | | $t_1$ = 0.1018 | 1.6032 | 42.51 | 603425 |
| | $R_2$ = 0.6391 | | | | |
| | | $S_1$ = 0.0724 | | | |
| | $R_3$ = 1.3925 | | | | |
| II | | $t_2$ = 0.0317 | 1.7885 | 50.45 | 789505 |
| | $R_4$ = 0.3324 | | | | |
| | | $S_2$ = 0.1074 | | | |
| | $R_5$ = 0.4278 | | | | |
| III | | $t_3$ = 0.0819 | 1.8807 | 41.06 | 881411 |
| | $R_6$ = 1.1822 | | | | |
| | | $S_3$ = 0.0493 | | | |
| | $R_7$ = 2.0100 | | | | |
| IV | | $t_4$ = 0.0371 | 1.6129 | 36.95 | 613370 |
| | $R_8$ = 0.1704 | | | | |
| V | | $t_5$ = 0.0866 | 1.5567 | 58.54 | 557585 |
| | $R_9$ = 1.0510 | | | | |
| VI | | $t_6$ = 0.0185 | 1.7755 | 37.90 | 776379 |
| | $R_{10}$ = 1.8631 | | | | |
| VII | | $t_7$ = 0.0238 | 1.7847 | 26.10 | 785261 |
| | $R_{11}$ = Ashp.[2] | | | | |
| | | $S_4$ = 0.0592[1] | | | |
| | $R_{12}$ = Ashp.[2] | | | | |
| VIII | | $t_8$ = 0.0238 | 1.7847 | 26.10 | 785261 |
| | $R_{13}$ = −2.5951 | | | | |
| IV | | $t_9$ = 0.0185 | 1.8807 | 41.06 | 881411 |
| | $R_{14}$ = −1.0510 | | | | |
| X | | $t_{10}$ = 0.0919 | 1.5567 | 58.54 | 557585 |
| | $R_{15}$ = −0.1704 | | | | |
| XI | | $t_{11}$ = 0.0371 | 1.6129 | 36.95 | 613370 |
| | $R_{16}$ = −2.0100 | | | | |
| | | $S_5$ = 0.0686 | | | |
| | $R_{17}$ = −1.9008 | | | | |
| XII | | $t_{12}$ = 0.0819 | 1.8807 | 41.06 | 881411 |
| | $R_{18}$ = −0.4844 | | | | |
| | | $S_6$ = 0.2172 | | | |
| | $R_{19}$ = −0.3514 | | | | |
| XIII | | $t_{13}$ = 0.0317 | 1.7885 | 50.45 | 789505 |
| | $R_{20}$ = −1.1862 | | | | |
| | | $S_7$ = 0.0034 | | | |
| | $R_{21}$ = −1.1378 | | | | |
| XIV | | $t_{14}$ = 0.1223 | 1.6433 | 47.76 | 643478 |
| | $R_{22}$ = −1.2371 | | | | |

-continued

| | (C.F.I. = 1.0000 E.F.L. = 1.0000 f/4.983) | | | | |
|---|---|---|---|---|---|
| Element | Radii | Thicknesses | $n_d$ | $\gamma_d$ | Type |
| | | $S_8 = 0.3374$ | | | |

[1] The stop lies between $R_{11}$ and $R_{12}$ and has a clear aperture of 0.1856 at a distance along the axis of 0.0204 from $R_{11}$.
[2] Surfaces 11 and 12 above are both aspheric, have coefficients taken from the equation just previously herein stated, and have the following shapes for a 94-degree full field:
$C_{11} = 0.073410$ $\beta_{11} = 0.55853$ $\gamma_{11} = -33.279$
$\delta_{11} = -144.42$ $\epsilon_{11} = 15586.$
$C_{12} = 0.184575$ $\beta_{12} = 1.63547$ $\gamma_{12} = 28.942$
$\delta_{12} = -42.037$ $\epsilon_{12} = 1715.6.$ In general, it is to be understood that minor modifications may have to be made in the radii, thicknesses, aspheric shapes and even occasionally in glass types according to the particular application, but such modifications are still to be considered as lying within the spirit of the invention. For example, if a glass type were to be changed to incorporate a more favorable type available from new developmental work in optical glass technology, the radii and thicknesses would all have to be modified accordingly. Even production runs would require close control for purposes of melt adaptation. In particular, minor modifications will need to be made from time to time in the aspheric shapes adjacent to the central stop to compensate for comatic residuals introduced by accumulated errors of construction or for altered fields of view. If the region of the spectrum of optimum color correction were to be altered from the visual to the infrared, for example, then even greater changes would have to be made in the constructional data, including changes in glass types to effect the new color correction, but even such more pronounced changes will still lie within the spirit of the invention.

As seen in the drawings, the lens system is substantially symmetrical and consists essentially of four components on either side of the central stop, and which in the example shown comprises 14 elements. It is evident, however, that this system may have more elements depending on the severity of the conditions imposed. Outside elements I and XIV are positive menisci and are used to keep the relative height through the system at a moderate magnitude. They also help preserve the symmetry of the system. Moreover, the compression in the cross section of the transmitted bundle of light achieved by the initial positive refraction helps in reducing the spherical aberration internally within the system, surface by surface. The initial positive meniscus element can also be used in such a way as to enhance the refraction of the chief ray at the second element, resulting in a smaller slope angle of the chief ray internally within the system. By a proper choice of optical power of this initial positive meniscus, this inward refraction of the chief rays can be obtained without imposing a severe penalty on the aberrations of higher order in the aperture in the outermost part of the field. In fact, the refraction at the third surface of the system approximates the aplanatic condition, a circumstance favorable to the overall correction, and one that permits considerable departures from minimum deviation without incurring the risk of uncontrollable aberrations.

If the optical power of the first element is too strong, the aberrations at the second element are unacceptable. If the first element is optically too weak, the physical size of the system increases objectionably for the same performance. The power of the first element can best be described in terms of its dioptric power, the thickness being neglected. Calculations show that the power of the first element must lie in the range 0.20 to 0.40 of the power of the entire system. The index of refraction of the first element is of lesser importance, being permitted to cover a wide range from 1.5 to 1.85 without any very great harm to the performance. In general, the higher the index the better, but the rate of variation is small.

In the case of the second element the lens must always be a negative meniscus, the surface on the side of the long conjugate being very weakly convex. Calculations show that the absolute or numerical value of the radius of curvature of this air surface on the long conjugate side must be no shorter than the absolute or numerical value of the focal length of the system, nor longer than three times the focal length of the system. If the radius is too long, the inward refraction of the chief rays gets out of control and the aberrations, particularly higher order negative astigmatism, cannot be compensated. If the radius is any shorter than the focal length, taken together with the negative dioptric strength of the element as a whole, the higher order oblique spherical aberration would become excessive.

Further calculations show that the thin lens dioptric strength of the second element, which is a negative meniscus element, must lie in the range from minus 0.9 to minus 2.5 in terms of the power of the system taken as unity. In the case of the second element, the index of refraction is of greater importance, the higher index being preferred. If a low index of refraction is used, the system must be larger in size, or else the oblique spherical aberration would become unacceptable. Accordingly, this invention requires the index of refraction of the second element to lie in the range from 1.56 to 1.85.

The spacing of the second air space of the system, lying between the strong meniscus negative second element and the strong meniscus positive third element is very critical. Design considerations require it to lie in the range from 0.08 to 0.40 of the focal length of the system. If this air space is larger than the above limits, the system becomes excessively large while if the air space is too small, the lens curvatures become steep and the clear aperture of the pupil becomes limited. The corresponding air space in the rear of the system on the short conjugate side, lying between the strong meniscus positive element and the strong meniscus negative element is also critical for a wide angle system used for a distant object plane. Design conditions show that it must lie in the range from 1.0 to 1.8 times the axial length of the air space in the front half of the system. If the deisgnated ratio of air spaces lies outside the indicated range, correction of the distortion in the system becomes impossible.

In the case of the third element, which is curved around the central stop D, calculations require the index of refraction to be high, if the physical size of the system is to be moderate. Accordingly, the range of index of refraction of this third element should lie between 1.62 and 2.12. If an index lower than 1.62 is used, then for equivalent performance at the same lens speed, the overall length of the system would become close to that already given by the inverted telephoto class, deemed inconveniently large. The dioptric power of the third element with the thickness neglected and measure in terms of the power of the system as unity lies in the range 1.20 to 2.00. If the dioptric power is greater than 2, the astigmatism and curvature of field become excessive. If the dioptric power is less than 1.20, too great a burden is thrown on other positive surfaces in the system, resulting in increased aberrations. Furthermore, the convex surface of this third element on the long conjugate side is more or less curved around the image of the central stop D. Therefore, the increase in aberrations off-axis is only slight. A stronger lens in general would require greater curvature, and produce departures from symmetry, as would also too weak a lens. This third element is air spaced from the very central group for the purpose of diminishing the amount of glass and therefore the absorption of light in the system. It is also a simple element, the inner concave surface being used to control the higher order of astigmatism when combined with the following surface of the fourth element.

Much of the optical power of the system as a whole resides in the cemented quadruplet on either side of the central stop, and indeed within the quadruplet much other correction can also be obtained. For example, much of the correction for longitudinal color aberration arises in the choice of v (nu) values as shown in the examples, and here one has also a substantial portion of the correction for spherical aberration. The general symmetry of the two quadruplets helps minimize coma, lateral color, and distortion before very large intermediate totals arise to complicate the full compensation by the oulying elements. The use of high index glass types also helps markedly in keeping the curvatures to a minimum consistent with the task to be performed, but it should be noted also that the addition of the fourth and eleventh lower index elements in the current sequencing of elements helps very materially in correcting the curvature of field that in the absence of astigmatism can best be represented by the Petzval sum. Indeed, I have found that for systems of this type the Petzval sum should be numerically small if adequate flatness of field is to be obtained. For the systems of widest angle and optimum balancing of aberrations, I have found that it sometimes is even beneficial if the Petzval sum becomes negative slightly, i.e., over-corrected, which in the central field tends to cause the means focus in the absence of astigmatism to lie slightly on the opposite side of the flat gaussian image plane from the lens system. However, the purpose of this is to compensate the higher order residual terms in the astigmatism and field curvatures, or as otherwise considered, in the radial and tangential image surfaces. Accordingly, the value of the optimum Petzval sum in no case exceeds numerically 0.05, lying therefore numerically in the range from $-0.01$ to $+0.05$ where the focal length is to be considered as unit length.

The cemented surface of strongest curvature in the front and rear quadruplets are most important to the optical performance of the system, and indeed these surfaces must be fairly closely curved around the image of the central stop in their respective media. This is to say that these cemented surfaces are approximately concentric surfaces, but because of refractions of the chief rays, must instead be so considered in their respective media. If the conditions were to be departed from too violently, it would be found that the far off-axis effect would be severe higher order coma or higher order oblique spherical aberration, or both in various mixtures. Moreover, if these cemented surfaces separate media of widely different v (nu) values, various higher order chromatic effects would be introduced having a deleterious effect on the performance of the system.

The wafer elements near the center of the system were introduced in order to maintain the chromatic astigmatism of the system on the one hand, and to reduce the actual sagittal depth of the aspherics on the other. The use of low v-value glass on either side of the central stop is important for obtaining good chromatic spherical correction in the tangential rays over the field. The balance between the v-values among the inner wafer elements VI and IX was used to control the chromatic coma and the chromatic astigmatism.

Further limitations on the secondary characteristics of the system may be stated, such as further spacing considerations and lens thicknesses. However, in view of the already distinctive nature of the new class of objectives, having cemented quadruplets on either side of the central stop, or with minor modifications thereof, further structural limitations is deemed unnecessary for present purposes. In general, all lens elements must have adequate central and edge thicknesses and in the wide angle application, these are often determined in effect purely by the need to have maximum illumination in the image at the edge of the field. However, such considerations do not enter in the case of the more restricted field for the application to microscopy and here I deem it feasible to employ variants of the basic design to achieve slight increases in the numerical aperture.

The FIGS. 1 and 2 depict the general character of the optical systems, being the graphical portrayal of Examples I and II, respectively.

In all of the above, wherever I employ symbols, I have used N for the total number of surfaces, R for the radius of curvature, t for axial thickness, S for axial separation, $n_D$ for the index refraction of the D-line of the spectrum (5893 angstroms, being the means of the sodium doublet), and v (nu) for the Abbe number, (xi) for the sagittal depth, n (eta) for the zone height or ordinate, and smallcase ($\beta$) beta, ($\gamma$) gamma, ($\delta$) delta, ($\epsilon$) epsilon for the successive aspheric coefficients. The above drawings and specification are to be considered as illustrative rather than restrictive, the scope of this invention being set out in the appended claims.

What I claim and desire to secure by Letters Patent of the United States is:

1. A lens system having wide angle objectives having numerical data substantially as follows:

| | (C.F.I. = 1.0000 | E.F.L. = 1.0000 | f/4.937) | | |
|---|---|---|---|---|---|
| Element | Radii | Thicknesses | $n_d$ | $\gamma_d$ | Type |
| I | $R_1 = 0.4832$ | $t_1 = 0.1016$ | 1.6433 | 47.76 | 643478 |
| | $R_2 = 0.6274$ | | | | |
| | | $S_1 = 0.0773$ | | | |
| II | $R_3 = 1.4230$ | $t_2 = 0.0323$ | 1.7550 | 53.28 | 755533 |
| | $R_4 = 0.3337$ | | | | |
| | | $S_2 = 0.1054$ | | | |
| III | $R_5 = 0.4398$ | $t_3 = 0.0836$ | 1.8807 | 41.06 | 881411 |
| | $R_6 = 1.2063$ | | | | |
| | | $S_3 = 0.0523$ | | | |
| IV | $R_7 = 2.0510$ | $t_4 = 0.0378$ | 1.6129 | 36.95 | 613370 |
| V | $R_8 = 0.1739$ | $t_5 = 0.0884$ | 1.5567 | 58.54 | 557585 |
| VI | $R_9 = 1.0724$ | $t_6 = 0.0189$ | 1.7755 | 37.90 | 776379 |
| VII | $R_{10} = 3.1058$ | $t_7 = 0.0243$ | 1.7847 | 26.10 | 785261 |
| | $R_{11} = $ Ashp. | | | | |
| | | $S_4 = 0.0621$ | | | |
| | $R_{12} = $ Ashp. | | | | |
| VIII | | $t_8 = 0.0243$ | 1.7847 | 26.10 | 785261 |

-continued

| | (C.F.I. = 1.0000 E.F.L. = 1.0000 f/4.937) | | | | |
|---|---|---|---|---|---|
| Element | Radii | Thicknesses | $n_d$ | $\gamma_d$ | Type |
| IV | $R_{13} = -3.1058$ | $t_9 = 0.0189$ | 1.8807 | 41.06 | 881411 |
| | $R_{14} = -1.0724$ | | | | |
| X | | $t_{10} = 0.0938$ | 1.5567 | 58.54 | 557585 |
| | $R_{15} = -0.1739$ | | | | |
| XI | | $t_{11} = 0.0323$ | 1.6129 | 36.95 | 613370 |
| | $R_{16} = -2.0510$ | | | | |
| | | $S_5 = 0.0709$ | | | |
| | $R_{17} = -1.9043$ | | | | |
| XII | | $t_{12} = 0.0852$ | 1.8807 | 41.06 | 881411 |
| | $R_{18} = -0.4931$ | | | | |
| | | $S_6 = 0.2229$ | | | |
| | $R_{19} = -0.3584$ | | | | |
| XIII | | $t_{13} = 0.0323$ | 1.7885 | 50.45 | 789505 |
| | $R_{20} = -1.1833$ | | | | |
| | | $S_7 = 0.0018$ | | | |
| | $R_{21} = -1.1792$ | | | | |
| XIV | | $t_{14} = 0.1260$ | 1.6433 | 47.76 | 643478 |
| | $R_{22} = -1.2623$ | | | | |
| | | $S_8 = 0.3225$ | | | | wherein the stop lies between $R_{11}$ and $R_{12}$ and has a clear aperture of 0.1852 at a distance along the axis of 0.0204 from $R_{11}$, and surfaces 11 and 12 above are both aspheric, have coefficients taken from the equation below, and have the following shapes for a 94-degree full field:
$C_{11} = 0.054683$ $\beta_{11} = 0.32272$ $\gamma_{11} = -38.786$
$\delta_{11} = 638.12$ $\epsilon_{11} = -10643$
$C_{12} = 0.183844$ $\beta_{12} = 1.39282$ $\gamma_{12} = 36.356$
$\delta_{12} = -720.12$ $\epsilon_{12} = 15382$ $$\xi_i = \frac{C_i \eta_i^2}{1 + 1 - C_i \eta_i^2} + \beta_i \eta_i^4 + \gamma_i \eta_i^6 + \delta_i \eta_i^8 + \epsilon_i \eta_i^{10}$$

where $C_i$ is the curvature of the ith surface, $\beta_i$, $\gamma_i$, $\delta_i$ and $\epsilon_i$ (beta$_i$, gamma$_i$, delta$_i$ and epsilon$_i$) are the coefficients of the aspheric polynomial terms, and $\xi_i$(xi$_i$) and $\eta_i$(eta$_i$) are the sagitta and zone height respectively.

2. A lens system having wide angle objectives having numerical data substantially as follows:

| | (C.F.I. = 1.0000 E.F.L. = 1.0000 f/4.983) | | | | |
|---|---|---|---|---|---|
| Element | Radii | Thicknesses | $n_d$ | $\gamma_d$ | Type |
| I | $R_1 = 0.4736$ | $t_1 = 0.1018$ | 1.6032 | 42.51 | 603425 |
| | $R_2 = 0.6391$ | | | | |
| | | $S_1 = 0.0724$ | | | |
| | $R_3 = 1.3925$ | | | | |
| II | | $t_2 = 0.0317$ | 1.7885 | 50.45 | 789505 |

-continued

| | (C.F.I. = 1.0000 E.F.L. = 1.0000 f/4.983) | | | | |
|---|---|---|---|---|---|
| Element | Radii | Thicknesses | $n_d$ | $\gamma_d$ | Type |
| | $R_4 = 0.3324$ | | | | |
| | | $S_2 = 0.1074$ | | | |
| | $R_5 = 0.4278$ | | | | |
| III | | $t_3 = 0.0819$ | 1.8807 | 41.06 | 881411 |
| | $R_6 = 1.1822$ | | | | |
| | | $S_3 = 0.0493$ | | | |
| | $R_7 = 2.0100$ | | | | |
| IV | | $t_4 = 0.0371$ | 1.6129 | 36.95 | 613370 |
| | $R_8 = 0.1704$ | | | | |
| V | | $t_5 = 0.0866$ | 1.5567 | 58.54 | 557585 |
| | $R_9 = 1.0510$ | | | | |
| VI | | $t_6 = 0.0185$ | 1.7755 | 37.90 | 776379 |
| | $R_{10} = 1.8631$ | | | | |
| VII | | $t_7 = 0.0238$ | 1.7847 | 26.10 | 785261 |
| | $R_{11} = $ Ashp. | | | | |
| | | $S_4 = 0.0592$ | | | |
| | $R_{12} = $ Ashp. | | | | |
| VIII | | $t_8 = 0.0238$ | 1.7847 | 26.10 | 785261 |
| | $R_{13} = -2.5951$ | | | | |
| IV | | $t_9 = 0.0185$ | 1.8807 | 41.06 | 881411 |
| | $R_{14} = -1.0510$ | | | | |
| X | | $t_{10} = 0.0919$ | 1.5567 | 58.54 | 557585 |
| | $R_{15} = -0.1704$ | | | | |
| XI | | $t_{11} = 0.0371$ | 1.6129 | 36.95 | 613370 |
| | $R_{16} = -2.0100$ | | | | |
| | | $S_5 = 0.0686$ | | | |
| | $R_{17} = -1.9008$ | | | | |
| XII | | $t_{12} = 0.0819$ | 1.8807 | 41.06 | 881411 |
| | $R_{18} = -0.4844$ | | | | |
| | | $S_6 = 0.2172$ | | | |
| | $R_{19} = -0.3514$ | | | | |
| XIII | | $t_{13} = 0.0317$ | 1.7885 | 50.45 | 789505 |
| | $R_{20} = -1.1862$ | | | | |
| | | $S_7 = 0.0034$ | | | |
| | $R_{21} = -1.1378$ | | | | |
| XIV | | $t_{14} = 0.1223$ | 1.6433 | 47.76 | 643478 |
| | $R_{22} = -1.2371$ | | | | |
| | | $S_8 = 0.3374$ | | | | wherein the stop lies between $R_{11}$ and $R_{12}$ and has a clear aperture of 0.1856 at a distance along the axis of 0.0204 from $R_{11}$, and surfaces 11 and 12 above are both aspheric, have coefficients taken from the equation below, and have the following shapes for a 94-degree full field:
$C_{11} = 0.073410$ $\beta_{11} = 0.55853$ $\gamma_{11} = -33.279$
$\delta_{11} = -144.42$ $\epsilon_{11} = 15586$
$C_{12} = 0.184575$ $\beta_{12} = 1.63547$ $\gamma_{12} = 28.942$
$\delta_{12} = -42.037$ $\epsilon_{12} = 1715.6$ $$\xi_i = \frac{C_i \eta_i^2}{1 + 1 - C_i \eta_i^2} + \beta_i \eta_i^4 + \gamma_i \eta_i^6 + \delta_i \eta_i^8 + \epsilon_i \eta_i^{10}$$

where $C_i$ is the curvature of the ith surface, $\beta_i$, $\gamma_i$, $\delta_i$ and $\epsilon_i$ (beta$_i$, gamma$_i$, delta$_i$ and epsilon$_i$) are the coefficients of the aspheric polynominal terms, and $\xi_i$(xi$_i$) and $\eta_i$(eta$_i$) are the sagitta and zone height respectively.

* * * * *